3,370,932
FLAME COLORING PRODUCT AND METHOD OF MANUFACTURING SAME

Paul E. Kelly, Farmington, and Orval J. Nutt, Livonia, Mich., assignors to Johnson Coal Cubing Co., Detroit, Mich., a corporation of Michigan
No Drawing. Filed Nov. 27, 1963, Ser. No. 326,367
1 Claim. (Cl. 44—15)

This invention relates to a physical composition and method of manufacturing the composition in the form of a briquet which when placed in the flame of an existing fire will impart color to the flame of the fire.

It has long been known that certain chemicals, when burned, will produce a colored flame. It is also known that such chemicals have been used in conjunction with fuels such as coal, coke, wood, wax, sawdust, etc., in order to produce a fuel that would burn with a colored flame.

An object of the present invention is to provide a physical combination of a flame coloring chemical or chemicals of the above character with certain blended carbon materials in a form which, rather than being used as a fuel, is intended as an additive to an existing fire to impart one or more colors to the flame of the fire over an extended period of time.

Another object is to provide a flame coloring briquet which is adapted to be placed upon an existing fire and consumed by the fire at a slow rate to produce a long-lasting flame coloring effect until the briquet has been reduced to a powdery ash.

Another object is to provide a method of manufacturing a blended color additive in the form of a firm-structured briquet wherein various percentages of chemicals may be added into the mixture to produce various flame-coloring effects, and which permits accurate control of the brilliance, variety and duration of these colors by controlling the percentages of the various materials introduced into the mixture prior to briquetting.

Another object of the present invention is to provide a method of manufacturing a blended color additive which may be performed with conventional fuel briquetting apparatus, thereby reducing initial equipment costs required to manufacture the product of the invention.

In accordance with the present invention, a flame coloring composition is provided which comprises an intimate and homogeneous physical mixture of three component groups of materials; (1) a suitable flame-coloring chemical, (2) a carbonaceous vehicle and (3) a binder. The invention also contemplates a method of compounding these component materials into individual articles in the form of a briquet, stick, block or the like of a suitable size and shape to permit one or more of the briquets to be placed in a desirable location or arrangement on an existing fire to produce a variety of pleasing flame-coloring effects.

With respect to the flame coloring chemical component of the composition, a suitable chemical adapted to impart color to the flame is selected according to the results desired as to duration, brilliance and variety of color. By way of example the chemical coloring agent may comprise one or more of the following chemicals listed according to the particular color derived therefrom:

Greenish colors:
    Barium sulfate
    Antimony chloride
    Zinc chloride
    Sodic biborate
    Baric chloride
    Cupric chloride
    Cupric nitrate
    Cupric sulphate
    Boric acid
    Phosphoric acid Bluish colors:
    Salts of nickel, arsenic, manganese
    Copper sulfate
    Copper chloride Orange colors:
    Magnesium chloride
    Potassium chloride
    Calcic chloride Red, violet and purple colors:
    Potassic chlorate
    Calcic carbonate
    Strontium chloride
    Strontium nitrate
    Lithium chloride Yellow colors:
    Cadmium sulfate
    Sodium chloride
    Calcium chloride It is to be understood that various other known chemicals, or combinations thereof, may be used to impart other colors to the flame.

The carbonaceous vehicle component of the composition is preferably a physical combination which includes at least four of the following ingredients: (1) fluid petroleum coke, (2) low volatile bituminous coal, (3) high volatile bituminous coal, (4) coke, (5) delayed petroleum coke, (6) charcoal, and (7) anthracite coal. Preferably fluid petroleum coke, low volatile coal and high volatile coal and at least one of the remaining four ingredients are usually present in the composition. In other words, coke, delayed petroleum coke, charcoal and anthracite coal may be used as alternatives for one another in combination with the first three above-listed ingredients. Also, two or more of the last four-listed ingredients may be added to the first three ingredients to make up the carbonaceous vehicle, or all seven ingredients may be used in combination if so desired.

It is also possible to combine fluid petroleum coke with any one of the remaining six ingredients in relative proportions determined by the coking tendency and volatile content of the said one ingredient, as set forth in more detail hereinafter. In such a two-ingredient combination, delayed petroleum coke combined with the fluid petroleum coke is preferred. Also, a preferred three-ingredient combination comprises fluid petroleum coke, delayed petroleum coke and low volatile coal.

The binder component of the composition is normally selected from the group consisting of flour, starch, silicate of soda, a petroleum binder such as asphalt, or coal tar pitch. Two or more of these binders may be combined, but this is not normally necessary.

The above chemical coloring agents, carbonaceous vehicle materials and binder are blended together in a predetermined percentage, depending on the type of binder used, the amount of other materials present in the total remaining blend, and the colors desired. With the exception of the binder, all of the materials are introduced into the mixture in a dry, granular form. The binder usually is a liquid but may also be a solid particle material. Preferably, the composition comprises about 15 to 35 percent by weight of the chemical coloring agent, about 55 to 81 percent by weight of the carbonaceous vehicle material and about 4 to 10 percent by weight of the binder material. Further characteristics of the composition are described in conjunction with the following detailed description of one preferred method of manufacturing the composition of the invention.

The improved method of the invention for manufacturing the flame color additive disclosed herein is somewhat analogous to briquetting processes employed in making conventional fuel briquets. Hence, the method may be performed by conventional equipment presently used by manufacturers of fuel briquets. By careful control of the process and the percentage of materials used therein, requirements which are customary in fuel briquetting, it is possible to produce the product of the invention so that uniform flame coloring results can be obtained time after time in a reliable manner. Briquetting offers a further advantage in that various percentages of chemicals can be added to the mixture to impart a variety of colors to existing flames. The brilliance, variety, and duration of these colors can be accurately controlled through the percentages of various materials introduced into the material prior to briquetting.

The method of the invention preferably includes the following ten enumerated steps:

(1) All the carbonaceous vehicle materials are employed in their dry, granular form and are first sized so that their particle size does not exceed one-quarter inch, and preferably averages under 1/8" for approximately 75 percent of the vehicle materials. Oversize material is therefore first reduced to proper size before adding to the mixture. This is accomplished by screening, the oversize raw material being returned through a crusher and then re-screened. The crushing of the oversize material is important for good compaction, and also helps to insure a more homogeneous blend of all of the various particles making up the vehicle mixture.

(2) Before adding binder to the vehicle mixture, it is first necessary to reduce the surface and inherent moisture content of the various particles of coke, delayed petroleum coke, fluid petroleum coke, anthracite and low and high volatile coal to less than about four percent, depending upon the particular binder being used. For petroleum binder or coal tar pitch, the moisture content should be less than about 1 percent. The second step of the method therefore comprises drying the carbonaceous vehicle ingredients by heating the mixture in a rotary dryer to a temperature within the range of about 120° F. to 140° F. for a sufficient period of time to bring the moisture content down to within the desired range.

(3) Simultaneously with the aforementioned drying step, but in a separate apparatus, the binder, if it comprises coal tar pitch or a petroleum binder, is heated to between about 270° F. to 290° F. and then introduced at this temperature into the dried carbonaceous vehicle mixture. Other binders can be introduced without heating in a liquid and/or dry particle form. The percentage of binder necessary to fabricate a firm structured briquet ranges from 4 to 10 percent, depending on the type, quality and quantity of the materials making up the total mixture.

(4) The next step comprises mixing the binder with the carbonaceous vehicle by passing the agglomeration resulting from the previous step through a series of paddle mixers where live steam is introduced to raise the moisture content to between about 2½ to 3½ percent in the case of petroleum or coal tar pitch binders, or to otherwise control moisture content when using other binders, and to increase the temperature of the mixture to between about 200° F. to 212° F. Mixing is continued at this temperature until the binder thoroughly covers each particle's surface and until all the vehicle ingredients are thoroughly intermingled into a completely homogeneous blend. The steam aids in heating the mixture sufficiently to effect a more complete bond between the solid particles and the binder, and it also permits rapid evaporation during subsequent briquetting and handling of the briquets.

(5) The blend is then cooled by agitating the mixture and blowing ambient air over it, or if further cooling is necessary, by also spraying water in combination with air directly into the mixture when unduly high ambient air temperatures are encountered, until the temperature of the mixture is lowered to between about 130° F. to 140° F.

Up to this point the method is customarily practiced as a continuous process, whereas the subsequent steps of the method are preferably performed as a batch process due to the introduction of the chemical coloring agent at this point.

(6) The mixture resulting from the above steps is then transferred to a rotary mixer wherein the selected chemical coloring agent is added to make up about 15 to 35 percent of the total mixture by weight. The chemical is mixed in until it is distributed throughout the entire mixture, and until the temperature of the mixture is reduced to between about 100° F. and 80° F. This mixing cycle usually runs for a period of about 3 to 6 minutes.

(7) In mixing the chemical into the mixture there usually occurs a "balling" effect in the rotary mixer, and it is essential that this "balling" be eliminated to assure a complete blend. Hence, after reaching the proper temperature of 80° F.–100° F., the mixture is removed from the rotary mixer and run through a pulverizer equipped with a screen having an opening size of ¼ inch or less.

(8) The mixture of the carbonaceous material, binder and chemical coloring agent is next fed to a conventional briquetting press where it is compressed into suitable briquet forms or shapes, such as pillow-shaped or egg-shaped lumps about 2 inches long.

(9) The briquets are discharged from the press onto an apron chain conveyor which carries the briquets to a packaging area. While in transit on the conveyor the briquets are allowed to cool to ambient or room temperature to facilitate subsequent packaging and handling.

(10) Each finished briquet as it arrives at the packaging station is placed into its own individual plastic bag and the bag is then heat sealed to effect an air tight closure. Preferably, polyethylene or other inexpensive plastic packaging material is used which will burn or vaporize when subjected to the heat from the flame of an ordinary wood fire. This individual packaging of the briquets permits handling them individually without soiling the hands or clothing and also protects the box or carton in which they are packaged. It also prevents the various chemical coloring agents and carbonaceous materials from absorbing moisture from the atmosphere.

By briquetting a color additive under extreme pressures in accordance with the above-described method, the density of the materials within the blend can be substantially increased, thereby providing a color additive having a burning duration in excess of what would result if each individual material contained within the blend were burned by itself. Since this briquet burns at a slower rate, it will be consumed more slowly which helps to impede the release of the color producing chemicals contained therein, thereby imparting a more complete and longer lasting color to a flame resulting from other fuel, such as wood.

With respect to the various functions of the individual ingredients of the composition of the invention, it is to be noted that the low and high volatile bituminous coals undergo a coking effect at high temperatures which helps keep the briquet intact as it is consumed. The coal undergoes this effect as the original binder ingredient is consumed, the coal thereby serving as a binder to make up for loss in adhesive action due to consumption of the original binder. The low volatile coal also has a tendency to swell, or expand, when heated which aids in preventing "scale over" on the heated surface of the briquet, and also causes cracks or fissures which permits flame to come into contact with color producing chemicals within the briquet.

The petroleum binders and the low volatile and high volatile coals have lower ignition temperatures and hence they tend to release their volatile gases almost immediately upon introduction to the existing flame. This characteristic of these components thereby aids in rapidly imparting color to the flame since these as well as the other carbonaceous ingredients have been thoroughly intermingled with the coloring agent in blending the briquet composition. The high volatile coal controls excessive coking conditions and particularly aids in early release of volatile gases for earlier results from the color producing chemicals.

The other carbonaceous vehicle ingredients, i.e., charcoal, coke, fluid petroleum coke and delayed petroleum coke, because of their lower volatile content cause the briquet to produce various colors with greater brilliance. The fluid petroleum coke ingredient is very important in this respect since it has a very low volatile content, a very high carbon content and is very slow burning. The delayed petroleum coke provides better structural characteristics in the briquet prior to burning by increasing the density of the briquet.

It is important to note that the flame coloring briquet of the present invention is not a fuel briquet, and is not intended for use as a fuel. While many of its physical properties consist in part of the characteristics of coal, coke, delayed petroleum coke, fluid petroleum coke and charcoal, these properties are employed as a means of carrying, and regulating the release of, the color producing chemicals which are blended into the briquet. Each of the various carbonaceous materials and binder making up the total mixture will start to burn at different temperatures, and will burn at different rates of speed and for different periods of time. This is considered to be quite important to the improved end result since the chemicals will also react and produce their coloring effect in direct proportion to the burning rate of the other non-chemical combustible materials making up this mixture. The various coke ingredients, since they are very low in volatile content and much slower burning than either the low volatile or high volatile coal, will extend the color producing periods of the various chemicals blended into the mixture. This is particularly true of the fluid petroleum coke ingredient.

Another advantage of the flame coloring briquet of the invention is that it will tend to retain its shape as it is consumed and hence will tend to stay in place upon the logs, charcoal, coal or other fuel of the existing fire until it is entirely consumed and reduced to a powdery ash. This permits placing of individual briquets as desired about the fire to make a pleasing and relatively permanent pattern or color arrangement. The residue is no more objectionable than the usual ash resulting from a wood, coal or charcoal fire.

By way of a preferred example of a formulation for a flame coloring briquet for use with a wood fire, the following ingredients and their relative proportions are given:

Carbonaceous vehicle—69% by weight
consisting of:                                          Percent Fluid petroleum coke _____ 25
Delayed petroleum coke _____ 25
Low volatile bituminous coal _____ 25
High volatile bituminous coal _____ 25

Binder: Asphalt—6%
Chemical coloring agent: copper chloride—25%

It is to be understood that the relative proportions of the carbonaceous vehicle ingredients may be varied in order to increase some characteristics while reducing others. For example, if the percentage of fluid petroleum coke is increased relative to the delayed petroleum coke, the briquet will be longer burning. Also, the coking effect may be increased by increasing the amount of low volatile bituminous coal relative to the high volatile bituminous coal.

By way of further example, the carbonaceous vehicle ingredients may be blended in the following percentages of total vehicle mix (before adding the chemical coloring agent and binder):

| Example | A | B | C | D |
|---|---|---|---|---|
| Fluid petroleum coke | 40 | 40 | 50 | 40 |
| Low volatile bituminous coal | 30 | 40 | 20 | 25 |
| High volatile bituminous coal | 15 | 15 | 20 | 25 |
| Delayed petroleum coke | 15 | 5 | 0 | 0 |
| Charcoal | 0 | 0 | 5 | 0 |
| Coke | 0 | 0 | 0 | 10 |
| Anthracite | 0 | 0 | 5 | 0 |

The percentages of carbon material listed above are merely used for illustration to show some of the various blend combinations that are possible depending upon the rate of ignition, burning duration, and the speed at which color producing chemical releases are desired. Many other blend percentages are possible, depending on how rapid a release is desired through the creation of a free burning product.

Depending on their availability and cost, coke, charcoal, and/or anthracite can usually be substituted for delayed petroleum coke.

The percentages of chemicals incorporated into this blended briquet depend, to some extent, on the duration desired and on the fuel being used to produce flame. Copper sulfate, for example, when blended with the carbon materials of the briquet in a percentage of 25 percent will cause a dark blue to greenish flame to appear in the flame produced from a coal fire. Copper sulfate, if used in the exact percentages as in the coal fire, will when added to a flame of a wood fire, produce a very deep an brilliant blue. In both cases, carbon content remaining constant, the colors resulting will increase, as will their brilliance and duration, as the percentage of chemicals is increased. The reverse of course is also true. By contrast, copper chloride when blended 25 percent by weight of the total mixture produces a blue flame when added to a coal fire, and a brilliant blue to green when introduced to a flame from the burning of wood.

The flame of a wood fire will produce blues, greens, red, yellows and orange when strontium is used with copper chloride in the total mixture. These same colors will normally not be as brilliant when added to a flame produced from the burning of coal.

As stated earlier, many various binders can be used in briquetting. Where steam is available, petroleum binder or coal tar pitch is preferred since earlier green strength and better ignition can be achieved. However, where steam is not available such binders as sulfide liquor, silicate of soda, mogul or the many pre-cooked starches can also be used.

In the claim:
1. A method of manufacturing flame coloring briquets comprising the steps of providing a mixture of granular carbonaceous materials comprising approximately 55 to 81 percent by weight of the mixture and consisting of a coke component and a coal component, said coke component comprising at least about 40 percent by weight of said vehicle and containing primarily fluid petroleum coke plus another coke selected from the group consisting of coke and delayed petroleum coke, said coal component comprising the remainder of said vehicle and being selected from the group consisting of low volatile bituminous coal, high volatile bituminous coal, anthracite and charcoal having a moisture content less than about 1 percent by weight and at a temperature between about 120° F. to 140° F., heating a binder to a liquid state between about 270° F. to 290° F., mixing the heated liquid binder in an amount comprising approximately 4 to 10 percent by weight of the mixture with the carbonaceous materials to obtain a completely homogeneous coating of said materials with said binder, simultaneously with said mixing step increasing the temperature and moisture content of the mixture by passing live steam thereinto until the moisture content ranges between about 2½ percent to 3½ percent of the mixture and the temperature thereof ranges from about 200° F. to 212° F., cooling said mixture until the temperature ranges between about 130° F. to 140° F., then mixing a flame-coloring chemical in an amount comprising approximately 15 to 35 percent by weight of the mixture in dry granular form into the carbonaceous and binder material mixture until thorough intermixture results and the temperature is reduced to between about 80° F. to 100° F., pulverizing the mixture to eliminate any balling effect resulting from the immediately preceding step and thereby reduce the mixture to a granular form and then pressing the mixture into individual briquets.

References Cited

UNITED STATES PATENTS

| | | | |
|---|---|---|---|
| 401,365 | 4/1889 | Murray et al. | 44—6 |
| 673,654 | 5/1901 | Douglass | 44—6 |
| 698,850 | 4/1902 | Peakes | 44—6 |
| 737,023 | 8/1903 | Rockwell | 44—6 |
| 1,705,020 | 3/1929 | Kohr | 44—6 |
| 1,750,371 | 3/1930 | Tanner | 44—6 |
| 2,017,402 | 10/1935 | Komarek et al. | 44—15 |
| 2,475,766 | 7/1949 | Williams et al. | 44—14 |
| 2,799,563 | 7/1957 | Shenker | 44—40 |

FOREIGN PATENTS 550,167   12/1942   Great Britain.

DANIEL E. WYMAN, *Primary Examiner.*

C. F. DEES, *Assistant Examiner.*